Dec. 4, 1934.   E. E. PRICE   1,983,191
VALVE STRUCTURE
Filed March 10, 1930
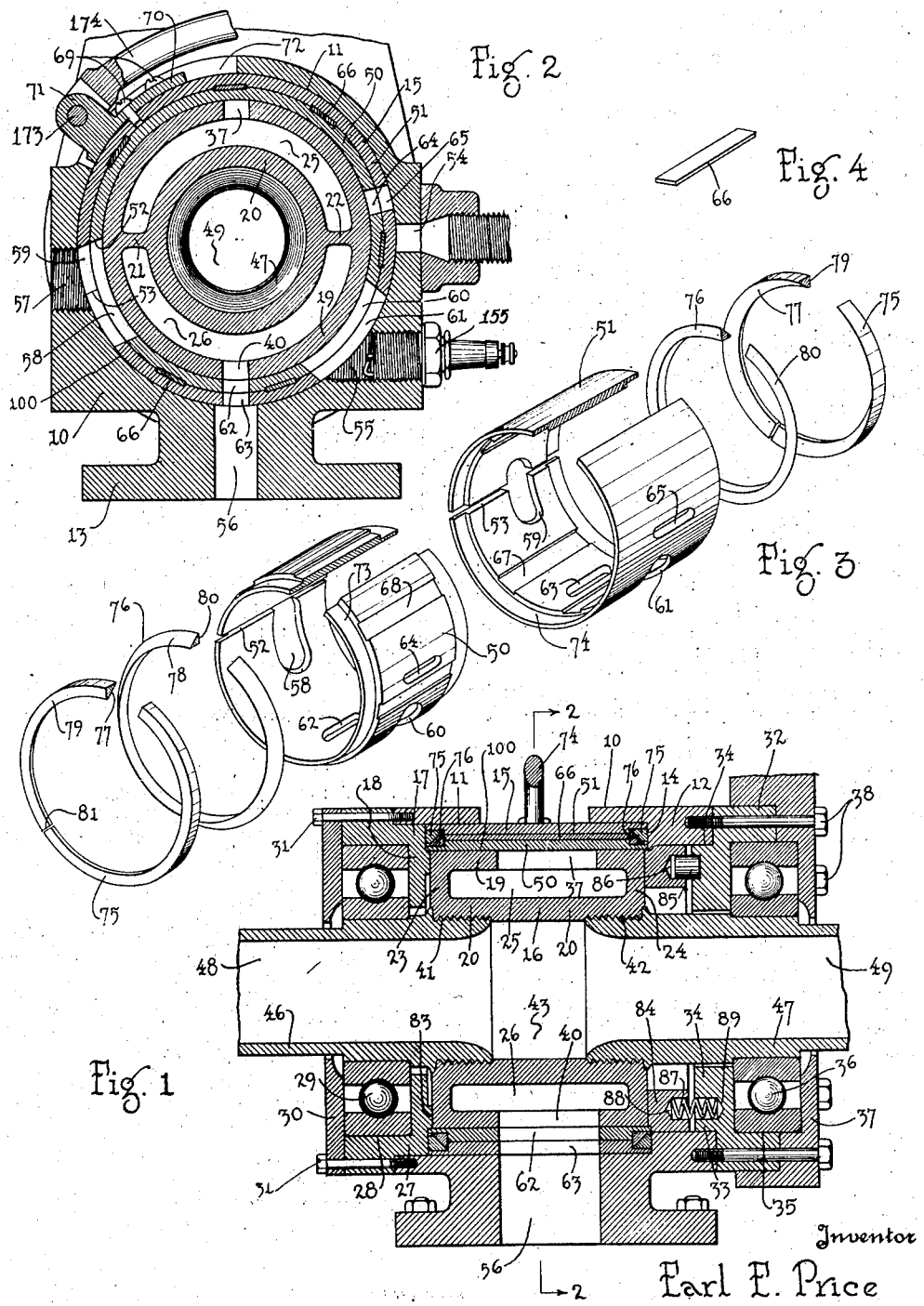
Inventor
Earl E. Price
By Caswell & Sagaard
Attorneys Patented Dec. 4, 1934

1,983,191

UNITED STATES PATENT OFFICE 1,983,191

VALVE STRUCTURE

Earl E. Price, Minneapolis, Minn.

Application March 10, 1930, Serial No. 434,627

10 Claims. (Cl. 60—44)

My invention relates to valve structures and particularly to rotary valves subject to excessive temperature.

An object of the invention resides in providing a valve which will readily compensate for variations in temperature and for wear without permitting undue leakage of fluid from the valve.

Another object of the invention resides in providing a case having a cylindrical bore, in providing a sleeve movably disposed within said bore, said sleeve also having a cylindrical bore, in further providing a core movably disposed within the bore of said sleeve, said case, sleeve and core having ports adapted to come into register upon movement of said sleeve and core.

Another object of the invention resides in constructing said sleeve with two split shells of resilient material, one expansible to snugly fit within said cylindrical bore, and the other contractible to snugly fit over said core.

A feature of the invention resides in constructing said shells with sealing strips splined thereto for preventing leakage from said ports along said shells.

Another object of the invention resides in forming said case with end walls between which said sleeve is retained and in disposing at the ends of said shell complemental sealing rings adapted to prevent leakage along the ends of said sleeve.

A feature of the invention resides in forming at the ends of said sleeve annular grooves for the reception of said sealing rings.

A still further object of the invention resides in constructing said sealing rings with complemental beveled surfaces, one of said rings being expansible and the other contractible to force the outer of said rings against the end wall of said case.

An object of the invention resides in forming said case with a shoulder against which one end of the core abuts and in providing a follower in said case for engaging the other end of said core.

Other objects of the invention reside in the novel combination and arrangement of parts and in the details of construction hereinafter illustrated and/or described.

In the drawing:

Fig. 1 is a longitudinal sectional elevational view of a valve structure illustrating the application of an embodiment of my invention thereto.

Fig. 2 is a cross sectional view taken on line 2—2 of Fig. 1.

Fig. 3 is a diagrammatic perspective view of the various parts of the sleeve assembly illustrating the arrangement of the same prior to assembly.

Fig. 4 is a perspective view of one of the keys used with the sleeve structure.

Although my invention is readily adapted for use in conjunction with rotary valves, it can be readily understood from the following description that the same may be utilized for various other purposes and in other different ways. For the purpose of illustrating the application of my invention, I have shown the same applied to a rotary valve structure such as employed with my invention for generating gas under pressure disclosed in my copending application for patent, Serial No. 399,075, filed October 11, 1929. This valve comprises primarily a case 10 of any desired construction formed with a longitudinal bore 11 extending completely through the same at one end and terminating in an end wall 12 forming a shoulder 14 at the other end. This case may be constructed with a base 13 for supporting the same or said case may be supported in any other suitable manner. Upon one end of the case 10 is mounted an end plate 18 which is formed with an inwardly projecting circular portion 27 adapted to fit into the outer end of the bore 11 and to be centered thereby. The end plate 18 is further constructed with a recess 28 adapted to receive a ball bearing 29. A cap 30 mounted upon the exterior of the plate 18 holds the ball bearing 29 in place. Both the cap 30 and the end plate 18 are secured to the case proper through cap screws 31 which extend jointly through cap and end plate and are threaded into the case proper. In a similar manner the other end of the case 10 is provided with an end plate 32 which is constructed with an outwardly projecting cylindrical portion 33 adapted to be received within a cylindrical opening 34 formed in the end wall 12 of case 10 which is concentric with the bore 11 and which forms therewith the shoulder 14 previously referred to. The end plate 32 similar to the end plate 18 is constructed with a recess 35 for the reception of a ball bearing 36 corresponding to the ball bearing 29. A cap 37 covers the recess 35 and serves to retain the ball bearing 36 within said recess. Both the cap 37 and the end plate 32 are held attached to the case 10 through a number of cap screws 38 which pass jointly through said cap and end plate and are threaded into said case.

Within the interior of the case 10 is rotatably mounted a core 16 which is formed with an outer wall 19 and an inner wall 20 providing a central bore 43 said walls being spaced from one another and connected together through two ribs 21 and 22. This core is further constructed with annular end walls 23 and 24 integrally connected to the walls 19 and 20 to form within said member two annular chambers 25 and 26. The chambers 25 and 26 are closed from the exterior except through two ports 37 and 40 the function of which will be later more fully described. The ends of the inner wall 20 of the core 16 are threaded as indicated at 41 and 42 to receive two hollow stub shafts 46 and 47 constructed with internal bores 48 and 49 communicating with the bore 43 of the member 26. By means of this construction a passageway is formed which extends completely through said shafts and the core which may be utilized to conduct a cooling fluid through the core structure. The two stub shafts 48 and 49 of the core 16 are journaled in the ball bearings 28 and 36 which serve to center the same with respect to the bore 11 of case 10. The external diameter of the core 16 is somewhat less than the diameter of bore 11, leaving a space 100 therebetween. The case 10 includes a number of ports 54, 55, 56 and 57 which communicate with the interior of the bore 11. Where the invention is employed with a device for generating gas under pressure, the said ports are arranged as shown, port 54 serving as an inlet port, port 56 serving as an exhaust port, port 57 as a vent port, and port 55 having a spark plug 155 therein. Where, however, the invention is to be used with other valve mechanisms or with other construction, the various ports required for the particular application may be positioned wherever desired to produce the particular results contemplated.

In conjunction with the case 10 and core 16, I employ a sleeve which I have indicated in its entirety at 15 and which is disposed in the space 100 between the outer surface of the core 16 and the bore 11 of case 10. This sleeve comprises an inner shell 50 and an outer shell 51 which are split longitudinally along lines 52 and 53. These shells are preferably constructed of a somewhat resilient material so that the same will resume their original shape when slightly contracted or expanded as the case may be. The shells 50 and 51 are of a thickness less than half the distance between the core 16 and the bore 11 and are of the same length so that the said shells may be telescoped and inserted within the case 10 and about the core 16. The shell 50 is made slightly smaller than the external diameter of the core 16 so that the same has to be expanded in placing the same about said core which effects a snug fit between said shell and core. In a similar manner the shell 51 is of a slightly larger diameter than the bore 11 so that when this shell is contracted and inserted into the bore 11, a snug fit is effected between said shell and the case 10.

The two shells 50 and 51 are constructed with registering openings 58—59, 60—61, 62—63, and 64—65. These openings form ports adapted to register with the various ports 54, 55, 56 and 57 to produce the desired results upon movement of said core member 16 and the sleeve 15. Rotation of the two shells 50 and 51 relative to one another is prevented through a number of splines or sealing strips 66 which are received within internal keyways 67 in the shell 51 and within external keyways 68 in the shell 50. These splines are disposed between the various ports in the said shells to prevent leakage from one port to the other along the space between the shells and at the same time to form a driving connection between the two shells to permit of moving the sleeve 15 as a unitary structure.

In the particular application of the invention illustrated in this application, the sleeve 15 is oscillated, though it can be readily comprehended that the same may be continuously rotated or moved in any other desired manner. For the purpose of oscillating the sleeve 15, said sleeve has attached to the outer shell 51 thereof through screws 69 a plate 70. This plate is formed with an outwardly extending lug 71 which lug and plate are movable along a slot 72 formed in the case 10. The slot 72 is of such a length that the sleeve 15 may be oscillated to successively bring ports formed by the openings 62—63 and 64—65 in alternate register with the fuel inlet 54 and the outlet 56. The lug 71 has pivoted to it through a pintle 173 a lever 174 which may be operated through any suitable mechanism.

The ends of the shell 50 are externally recessed as indicated at 73 in Fig. 3 while the outer shell 51 is internally recessed as designated at 74 to form grooves in the ends of the said sleeve. Within these grooves are disposed complemental rings 75 and 76 which are constructed with contacting beveled surfaces 77 and 78, and with spaced parallel radial faces 79 and 80. The rings 75 are split as indicated at 81 and are constructed of a somewhat resilient material so as to spring back to their original shape when expanded, while the rings 76 may be solid. The rings 75 are constructed slightly smaller in diameter than the internal diameter of the recess 74 so when pressure is applied to the ends of said rings, the rings 75 spring apart to cause the ring structure to exactly fill the spaces between the ends of said sleeve and the ends of said case. Similar rings are employed in both ends of the sleeve 15. The entire sleeve assembly is shown in diagrammatical form in Fig. 3 with all of the parts arranged in the order of assembly.

When the sleeve 15 is disposed within the case 10 the end ring 75 at one end of said sleeve abuts against the shoulder 14 formed on the end wall 12 of the case proper. The other ring 75 abuts against a similar shoulder 17 formed on the end plate 18. The entire sleeve assembly is constructed slightly longer than the distance between the shoulders 14 and 17 so that the rings 75 have to be expanded to permit of the assembly of the sleeve structure. This has the effect of forcing the rings 75 against the shoulders 14 and 17 and effecting a tight joint between said shoulders. By means of the radial expansion of the two shells 50 and 51 and the longitudinal expansion of the rings 75, a tight joint is afforded through the sleeve 15 between the core 16 and the case 10 both circumferentially and longitudinally so that leakage from the various ports is greatly reduced.

The end wall 23 of core 16 abuts against a shoulder 83 formed on the end plate 18 while the other end wall 24 of said core abuts against an annular follower 84 snugly received within the cylindrical opening 34 in the case 10. A number of dowel pins 85 secured to the end plate 32 and received within holes 86 in the follower 84 serve to prevent rotation of said follower and permits of the follower abutting against the end wall 24 of the core member 16. This follower is caused to engage the end wall through a number of compression coil springs 87 which are disposed in complemental recesses 88 and 89 formed in the follower 84 and the end plate 32. By means of this construction the core member 16 is held in proper position within the sleeve 15 and leakage past the ends of the same is prevented. If desired, followers may be installed at both ends of the sleeve member instead of one end only as shown.

In the operation of the invention where the same is to be used in conjunction with a device such as disclosed in my copending application for patent previously referred to, the shafts 48 and 49 are constantly rotated at a uniform rate of speed, and in addition the sleeve rocked or oscillated through the lever 74. Such movement causes the ports 37 and 40 in core 16 to successively come into register at the proper time with the various ports 54, 55, 56, and 57 of case 10 through the openings in sleeve 15, to inject fuel mixture into the chambers 25 and 26, ignite it, deliver the gas under pressure to the gas reservoir, and exhaust said chambers. It is however to be understood that various different arrangements of ports may be adopted and a relative movement of the parts varied to suit the requirements so as to produce different results than those contemplated with the device with which the invention is shown in this application rendering my invention highly applicable to any number of devices where a sealed joint is required between two or more revoluble members. Where only one of the members moves, one of the shells of the sleeve may be dispensed with and the other of the sleeves keyed to either the fixed or revoluble member as desired to produce similar results. Such construction is within the range of equivalents contemplated with my invention and has hence not been shown in detail in this application.

The advantages of my invention are manifest. The sleeve forming the connection between the fixed member and the rotary member is expansible both radially and longitudinally to compensate for expansion and contraction occasioned by variation in temperature and to take up wear between the two members. The device is extremely simple and can be constructed at a reasonable cost and by ordinary machine tools and methods. My invention is fully automatic and when once installed will not require attention, except for the purpose of lubrication, continuing to operate indefinitely and to maintain a positive seal between the parts of the same.

Changes in the specific form of my invention, as herein disclosed, may be made within the scope of what is claimed without departing from the spirit of my invention.

Having described my invention, what I claim as new and desire to protect by Letters Patent is:

1. In combination with a case having a cylindrical bore, a sleeve movable within said bore, said sleeve also having a cylindrical bore, a core independently movable within the bore of said sleeve, said case, sleeve and core having ports adapted to come into register upon movement of said sleeve and core, said sleeve being constructed with an inner shell and an outer shell yieldingly engaging the outer and inner surfaces respectively of said core and case, and means between said shells forming a seal between the various ports in said sleeve.

2. In combination with a case having a cylindrical bore, a sleeve movable within said bore, said sleeve also having a cylindrical bore, a core independently movable within the bore of said sleeve, said case, sleeve and core having ports adapted to come into register upon movement of said sleeve and core, said sleeve being constructed with an inner shell and an outer shell yieldingly engaging the outer and inner surfaces respectively of said core and case, and axially disposed sealing strips between said shells and splined thereto for forming a seal between the various ports of said shell.

3. In combination, a case having a cylindrical bore and formed with end walls, a core, a leak proof sleeve structure rotatably mounted within said bore and encircling said core, said case and sleeve structure having ports therein adapted to come into register upon rotation of said sleeve structure, said sleeve structure comprising concentric shells expansible and contractible circumferentially and complemental rings cooperating with said shells and movable in an axial direction, said rings retaining engagement with one another throughout such movement.

4. In combination, a case having an end wall, a core, a sleeve movable within said case and encircling said core, a pair of complemental rings having contacting beveled surfaces, a groove in the end of said sleeve for the reception of said rings, one of said rings being expansible and the other contractible within said groove to force the outermost of said rings out of the groove and against the end wall of said case, said case and sleeve having ports adapted to come into register upon movement of the sleeve.

5. In combination, a stationary member having a cylindrical bore, a member within said bore, a split shell of resilient material disposed between said members and adapted to hug one of said members to form a seal therebetween, said members and shell having ports adapted to come into register upon movement of said movable member, and a sealing strip between said shell and the other of said members for effecting a seal therebetween, said sealing strips extending at right angles to the direction of movement of said movable member.

6. In combination, a case having a cylindrical wall and end walls formed with radial surfaces, a core, a movable sleeve structure within said case and encircling said core, said case and sleeve structure having ports adapted to come into register upon movement of said sleeve structure, said sleeve structure comprising concentric shells expansible and contractible circumferentially to engage said cylindrical wall and complemental rings cooperating with said shells and movable axially to urge said rings into engagement with said sleeve structure and the radial surface of one of said end walls to form a seal between said sleeve structure and said end wall of said case.

7. In combination, a case having a cylindrical wall and end walls formed with radial surfaces, a core, a movable sleeve structure within said case and encircling said core adapted to fit within said cylindrical wall, said case and sleeve structure having ports adapted to come into register upon movement of said sleeve structure, said sleeve structure being formed with parts movable axially to yieldably engage the surfaces of said end walls to effect a seal between said end walls and sleeve structure.

8. In combination, a case having a cylindrical bore, a core, a sleeve structure rotatable within said bore and encircling said core, said sleeve structure comprising expansible and contractible inner and outer shells circumferentially arranged about one another and within said bore, said case and sleeve structure having ports adapted to come into register upon movement of said sleeve structure, said shells having axially extending slots therein disposed at diverse portions of said sleeve structure, and a longitudinally extending key between said shells for causing simultaneous movement thereof, said key forming a seal between said shells.

9. In combination, a case having a cylindrical wall and end walls formed with radial surfaces, a core, a sleeve structure rotatable within said case and encircling said core, said case and sleeve structure having ports adapted to come into register upon movement of said sleeve structure, said sleeve structure comprising concentric shells expansible and contractible circumferentially and cooperating with the cylindrical wall of said case, said sleeves having annular facing grooves therein and providing in conjunction, an annular pocket, having a seat at one end thereof and a pair of complemental rings within said pocket, one thereof engaging the radial surface on one end of said case and the other thereof engaging the seat in said pocket, said rings being resilient and serving to move axially to effect a seal between the end walls of said case and said sleeve structure.

10. In combination, a case having a cylindrical wall and an end wall formed with radial surfaces, a core, a sleeve structure within said case and encircling said core, said case and sleeve structure having ports adapted to come into register upon movement of said sleeve structure, a pair of rings having contacting beveled surfaces, one of said rings having an outer cylindrical surface, the other of said rings having inner cylindrical surfaces, the ring with the inner cylindrical surface being normally expanded and the other ring being normally contracted, said rings being resilient and cooperating to move in an axial direction to effect a seal between said sleeve structure and case.

EARL E. PRICE.